United States Patent [19]

Glatt et al.

[11] Patent Number: 4,858,552

[45] Date of Patent: Aug. 22, 1989

[54] APPARATUS PELLETIZING PARTICLES

[75] Inventors: Werner Glatt; Reinhard Nowak, both of Binzen, Fed. Rep. of Germany

[73] Assignee: Glatt GmbH, Binzen, Fed. Rep. of Germany

[21] Appl. No.: 27,431

[22] Filed: Mar. 18, 1987

[30] Foreign Application Priority Data

Mar. 19, 1986 [DE] Fed. Rep. of Germany ....... 3609133

[51] Int. Cl.$^4$ .............................................. A23G 3/26
[52] U.S. Cl. ........................................ 118/19; 118/62; 118/303; 118/716; 427/3; 427/185; 427/213
[58] Field of Search ....................... 118/19, 20, 24, 62, 118/303, 663, 716; 427/3, 185, 213; 241/5, 40

[56] References Cited

U.S. PATENT DOCUMENTS

| | | | |
|---|---|---|---|
| 2,561,394 | 7/1951 | Marshall | 427/213 |
| 3,112,220 | 11/1963 | Heiser, Jr. et al. | 427/213 |
| 3,911,183 | 10/1975 | Hinkes | 427/213 X |
| 3,912,231 | 10/1975 | Weber | 118/303 X |
| 4,117,801 | 10/1978 | Dannelly et al. | 118/303 X |
| 4,217,851 | 8/1980 | Biehl et al. | 427/213 X |
| 4,535,006 | 8/1985 | Naunapper et al. | 427/213 |

Primary Examiner—Timothy V. Eley
Attorney, Agent, or Firm—Kenyon & Kenyon

[57] ABSTRACT

An apparatus and process for making pellets from a fluidizable material having a fluid bed chamber with a perforated base and an open upper end in which a rotatable means for shaping the pellets is located. Gas for the formation of a fluidized current is introduced through the perforated base. A fluid spray for the agglomeration and coating of the fluidizable material is introduced into the fluid bed chamber, preferably near the perforated base in the central area of the fluid bed chamber. Additionally, a device for channeling agglomerated material is preferably located at a distance above the perforated base and concentrically with the longitudinal axis of the sprayer. A fluidized current carries particles, while still plastic, upwardly through the channeling device causing them to impinge on the underside of the rotatable means. The rotatable means thereby shapes the agglomerated material, and urges the shaped material outwardly where it falls toward the perforated base and is recirculated to form larger pellets. The apparatus and process also includes other treatments of the material such as coating and drying, as the material is pelletized.

39 Claims, 8 Drawing Sheets

APPARATUS PELLETIZING PARTICLES

BACKGROUND OF THE INVENTION (1) Field of the Invention

This invention relates generally to an improved apparatus and process for the pelletizing and related treatment of particles, and more specifically, to an improved method and apparatus for the pelletizing and related treatment of pharmaceutical or similar products in a fluid bed container.

(2) Description of Related Art

In certain known pelletizing processes of the prior art, a powdery substance is made doughy in a mixer, the doughy mass is shaped in an extruder, and the extruded mass is subsequently shaped into pellets, i.e., spherical pieces, in a drum or on a rotating pelletizer plate. The still moist pellets are then dried in a further step as, for example, in a fluid bed process.

Overall, pelletizing processes of this nature are comparatively cumbersome and require considerable equipment expenditures. A particular disadvantage is the necessary transfer from one treatment station to another (e.g., mixer to extruder to pelletizer plate).

SUMMARY OF THE INVENTION

The present invention comprises an apparatus and process for pelletizing a fluidizable material, such as a pharmaceutical composition in powdered form, wherein the material to be pelletized is introduced into a fluid bed chamber having a base means, and outer sidewalls extending upwardly from said base means toward an upper end of the chamber which has an open portion. The base means includes perforations therein to permit entry of an upwardly flowing stream of gas into the chamber. The material to be pelletized becomes entrained in, and suspended by, said gas stream to form a fluidized bed.

In order to promote agglomeration of particles of said material, the apparatus may also include means for spraying a liquid, such as a binding agent, into the fluidized bed chamber.

The apparatus of the invention also includes rotatable means, preferably comprising a generally circular shaped disk-like element, positioned near the upper end of the chamber such that agglomerated particles carried by said upwardly flowing gas stream are forced against the underside or guide surface of said rotatable means. The force on the agglomerated particles created by the rotation of said rotatable means causes the particles impacting thereon to be shaped and directed outwardly toward the sidewalls of the chamber. At the same time, as the particles are still relatively plastic, they are rounded into pellets due to the spinning action imparted by contacting the rotatable means.

In order to advantageously direct the rising flow of entrained particles against the underside of the rotatable means, the chamber may also include channeling means disposed therein, such as a vertical conduit or tube. In order to produce a stronger gas flow within the channeling means, the channeling means may be aligned above a section of the base means which is provided with a greater number of perforations, or perforations of larger area, to produce a greater volume of gas flow in that section and, thus, through the channeling means. The differential flow rate of the gas streams within and outside of the channeling means will induce a circulating current in the fluidized bed, thus promoting return flow of particles which have been deflected by the rotating means.

Preferably, the height of the channeling means may be varied to adapt the differing particle sizes, gas stream velocities and liquid spray medium. Further, the channeling means may be adapted to cooperate with the spraying means to serve as a means for coating the particles as they are passed through the channeling means.

It is therefore an object of present invention to simplify the production and treatment of pellets.

It is a further object of the present invention to reduce the equipment expenditure required for the production and treatment of pellets.

It is a further object of the present invention to provide an apparatus capable of spraying, coating, drying, pelletizing and compressing of material to be pelletized.

It is yet a further object of the present invention to provide a fluid bed arrangement for making pellets which provides the further treatments of coating, compressing and drying practically in one circulation.

It is a further object of the present invention that the pelletizing and related treatment process be readily controlled as a function of the desired product.

These and other objects of the present invention will become apparent from the following description of the preferred embodiment and claims in conjunction with the drawings.

DETAILED DESCRIPTION OF THE INVENTION

Figure 1:
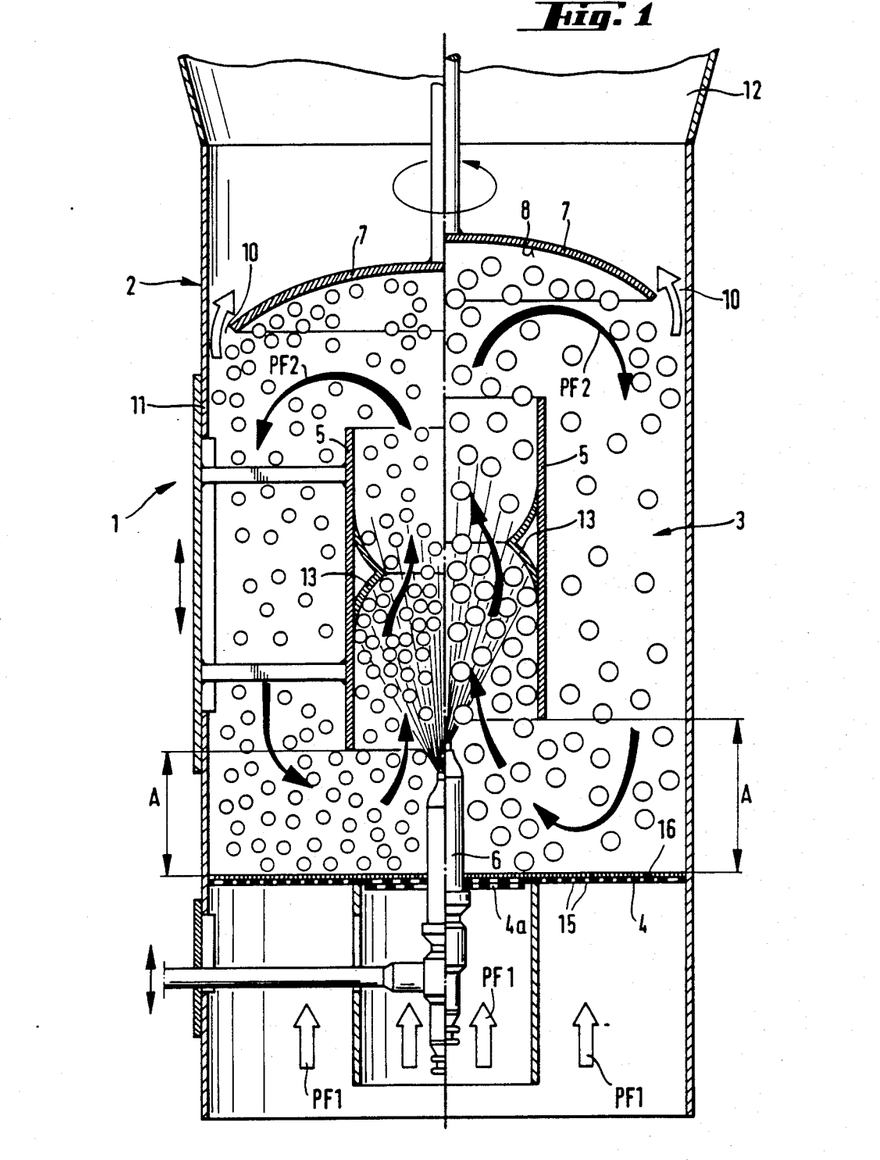
FIG. 1 is vertical cross sectional view of the apparatus of the present invention.

The fluid bed apparatus of the present invention, as shown in FIG. 1, serves as a device for the pelletizing or similar treatments of fluidizable particles. The apparatus has a fluid bed chamber 3, the lower end of which is defined by a base means 4 which is preferably perforated, and through which gas, for example, air or nitrogen, can be admitted corresponding to arrows PF1. The sides of chamber 3 are defined by outer sidewalls in the form of a housing 2 extending upwardly from base means 4. Within the fluid bed chamber 3, the material to be treated is preferably carried by the gas in a direction corresponding to the arrows PF2.

Within the chamber 3, a channeling means 5, such as a rising tube, may be placed approximately concentrically to the housing 2 and at a distance from the base means. The channeling means 5 encourages the formation of a circulating fluid bed within the chamber 3 in the direction of arrows PF2. Additionally, spraying means 6, such as a spray nozzle, is arranged preferably centrally in the fluid bed chamber 3 spaced above the base means 4. The spraying means is used for the introduction and direction of a fluid, preferably a liquid, e.g., a binding agent, into the fluid bed chamber 3.

The apparatus of the present invention also comprises a rotatable means 7, preferably in the form of a rotatable disk in the upper area of the fluid bed container 3. Most preferably, the rotatable means 7 is located in the upper end of chamber 3 above the spraying means 6 and the channeling means 5, and in spaced relation to channeling means 5. This arrangement has been found to be advantageous to the formation and maintaining of a circulating fluid flow within fluid bed chamber 3. The rotatable means 7 provides the possibility for simultaneous pelletizing and compressing within the apparatus of the present invention, in addition to the customary coating and drying processes.

In the preferred operation of the present invention, fluidizable starting material, preferably having a particle size of approximately 0.001 mm to 3 mm, is initially introduced into the fluid bed chamber 3. The fluidizable starting material is carried upwardly in the channeling means 5 by the gas stream (PF1) where it comes into contact with a spray from spraying means 6, preferably containing solid particles and binding agent which promote agglomeration of the fluidizable material into larger, relatively plastic, particles. The plastic particles are subsequently carried to the upper region of the fluid bed and are caused to impinge upon the guide side 8 of rotatable means 7, (see FIG. 8) and are then deflected approximately radially outward and again carried to the lower inlet area at the rising tube 5.

In this manner, a treatment can be achieved which corresponds approximately to that obtainable with a pelletizing disk. It will be appreciated by those skilled in the art that if rotating means 7 was stationary, the movement of the particles in the direction of arrows PF2 along the underside 8 of the rotor disk 7 would tend to cause the particles to be rolled into oblong or cylindrical shapes (as results when one rolls dough in a single dimension). The rotation of rotatable means 7, however, provides an additional degree of rotation to the shaping function provided by the rotating means 7 resulting in a more rounded particle (comparable to dough shaping in a circulating or two-dimensional motion).

The process can be repeated several times, in the course of which the particles can become enlarged, e.g., two to fourfold. To adapt to these particles, the size of which increases during the process, the channeling means 5, the rotatable means 7 and the spraying means 6 are preferably height-adjustable individually or together, and most preferably independent of each other. The adjustability of the channeling means 5, rotatable means 7 and spraying means 6 is illustrated in FIG. 1 by the above mentioned parts shown in different positions in the two halves of the illustration. Advantageously, the number of rotations of the rotatable means 7 can also be controlled.

Figure 10:
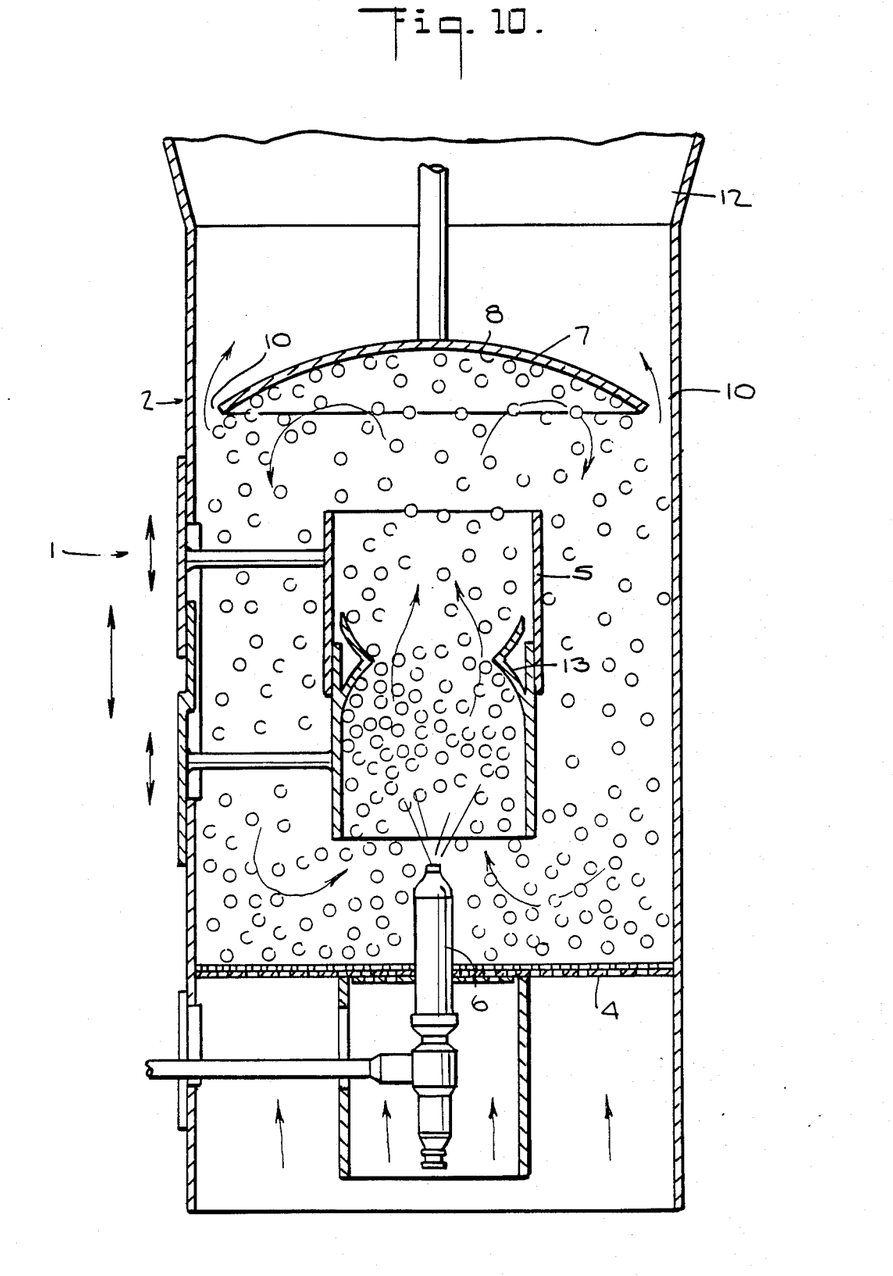

The height adjustability of the channeling means 5 serves especially for adapting to different particle sizes, to different stream velocities, and to different spray media. The adjustability of the spraying means permits aiming at different product densities with the spraying means 6 directed advantageously to the area of the material to be treated which contains the greatest particle density. By raising the height of the channeling means 5, its distance to the base means 4 is increased, so that appropriate space conditions can be created at the inlet of the channeling means 5. Correspondingly, by adjusting the height of the rotatable means 7, an adaptation of the distance from the rotatable means 7 to the upper end of the channeling means 5 can be created. Furthermore, as shown in FIG. 10, it is possible to change the length of the channeling means 5 telescopically. As the channeling means preferably serves as the coating section, adjustments to the particular treatment material, e.g., changing the material during the course of the treatment, is possible. Telescopic adjustment of channeling means 5 can take place in combination with the previously mentioned height adjustability of the other elements. By extending the channeling means 5, particles can be prevented from falling back into the channeling means 5 which would tend to occur when the product volume and corresponding product level are high.

Resetting the positions of the elements can preferably take place during the course of processing one load. A device equipped preferentially with a process control computer (not shown) can be provided for readjusting the channeling means 5 and/or the rotatable means 7 and/or the spray means 6 and/or the perforations in the base means 4. Thus, with the present invention, control as a function of the product can take place even during the treatment process.

It is of particular advantage that in addition to pelletizing, further treatment processes, in particular, coating, compressing and drying can be carried out within the apparatus of the present invention. Since the particles are still relatively plastic upon impact on the rotatable means 7, they are still capable of being shaped.

Figure 2:
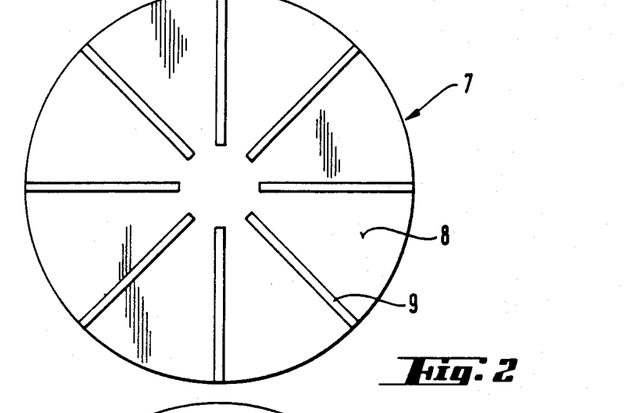
FIG. 2 and FIG. 3 are views of the undersurfaces of two embodiments of the rotatable means of the present invention, having differently shaped directing means.
Figure 3:
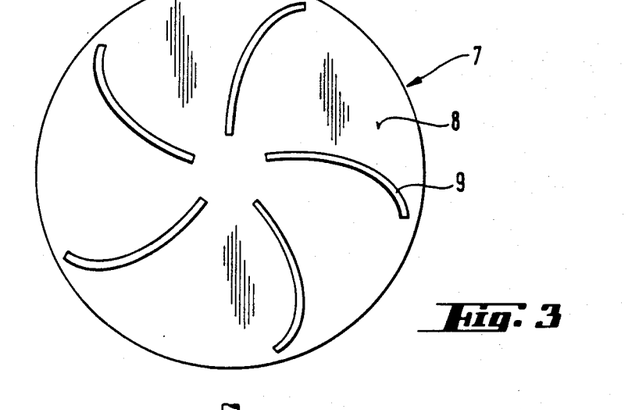

FIGS. 2 through 5 show different embodiments of the rotatable means of the present invention. FIGS. 2 and 3 show the guide side 8 of a rotor disk, which includes means 9 for directing the impacting particles radially outward, thereby enhancing rotation of the particles, and thus pellet formation. The directing means 9 are shown straight (FIG. 2) or curved (FIG. 3) and extend radially from the center areas of the guide side 8 of the rotor disk. As noted, the radial motion of the material being treated toward the outer periphery of the fluid bed container 3 is enhanced with either of these directing means 9. This is also advantageous for the compressing which occurs in the pelletizing process.

Figures 4, 5:
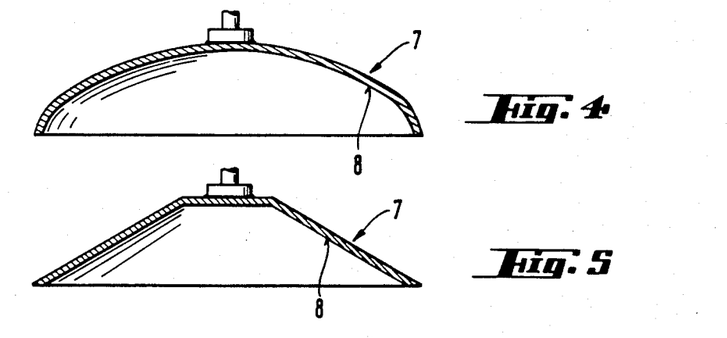
FIG. 4 and FIG. 5 are cross sectional views of two embodiments of the rotatable means of the present invention.

In a simple form, the rotatable means 7 may be a planar disk. FIG. 1 as well as FIGS. 4 and 5 show comparatively modified forms of the rotatable means 7, which are bell-shaped (FIGS. 1 and 4) or conically tapering upwardly (FIG. 5). Shaping the guide side 8 either curved or slanted provides a more favorable deflection of the gas stream, with the material being treated also being redirected downwardly in the direction of arrows PF2.

The annular gap area 10 surrounding the rotatable means 7 is preferably larger than the cross sectional area of the gas inlet. The cross sectional area of the gas inlet is defined by the sum of the perforations in the base means 4. In this way, even fine particles are prevented from being pulled outside the fluid bed area into a filter means 12 located above the fluid bed area by increased air velocities in the annular gap area. It has been determined that desirable results may be obtained by designing the annular area 10 to be at least 1.1 times larger than the gas stream inlet.

Figure 11:
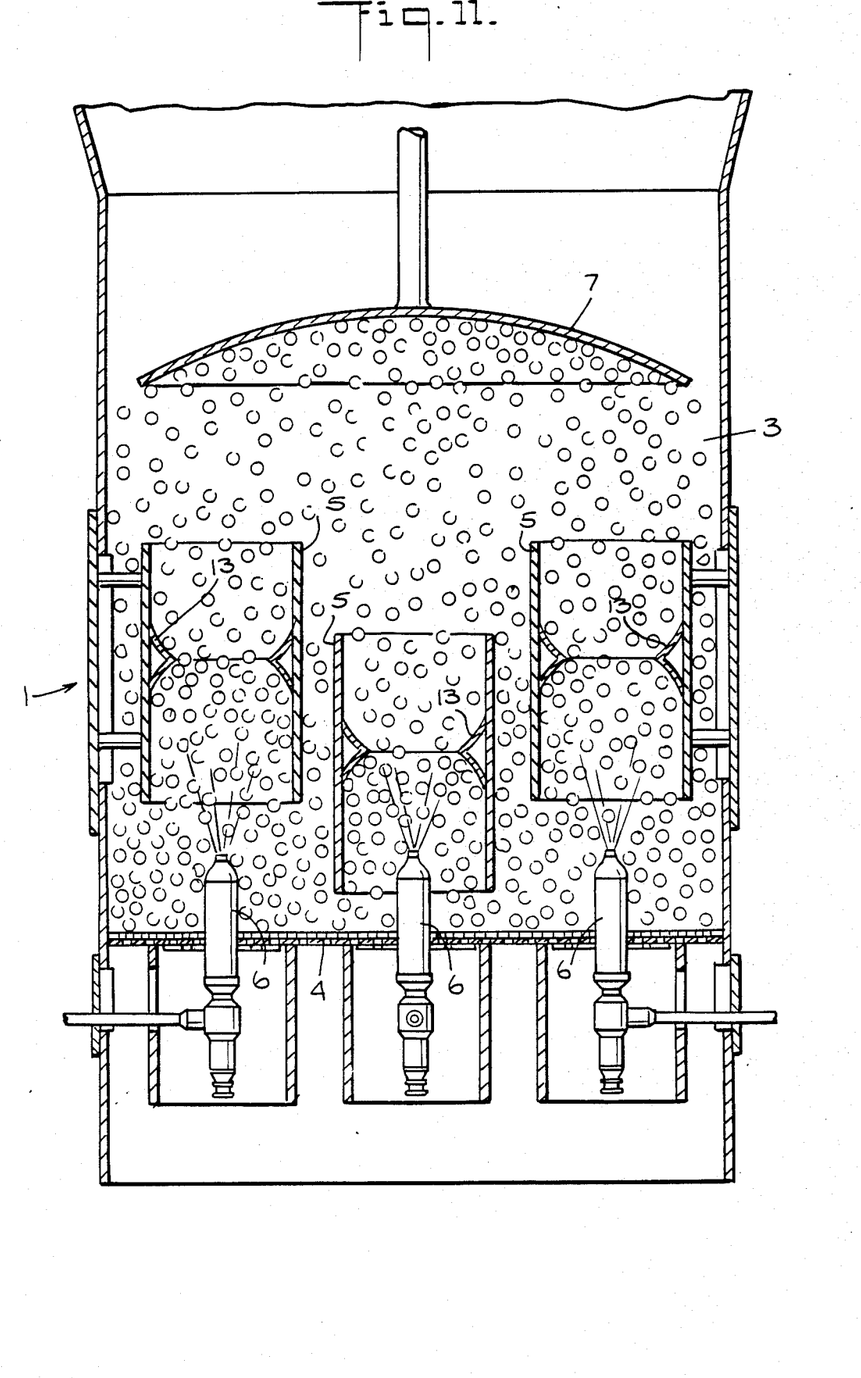
Figure 12:
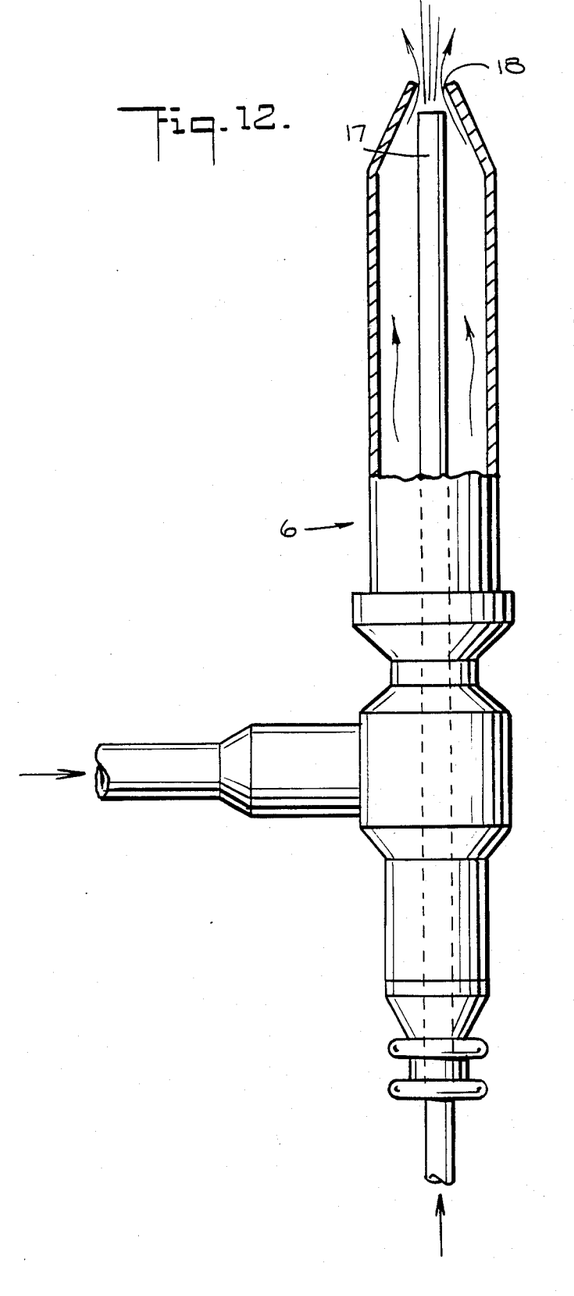

It will be appreciated by those skilled in the art that, within the scope of the present invention, it is possible to provide channeling means comprising several rising tubes, instead of a single channel means 5, within a fluid bed chamber 3 as shown in FIG. 11. Several rotatable means in the form of rotor disks and several spraying means in the form of spray nozzles can also be provided. The spraying means 6 can further be constructed as a multihead nozzle if the total quantity of the sprayed-in fluid is desired to be increased without increasing the size of the individual droplets.

Guide means 13 such as guide surfaces can be placed within the channel means 5 for the deflection of currents within the channeling means. The guide means 13 provide a certain mass compression of the particles to be sprayed in the spraying area and facilitate better coating of the particles with the spray medium.

Figure 6:
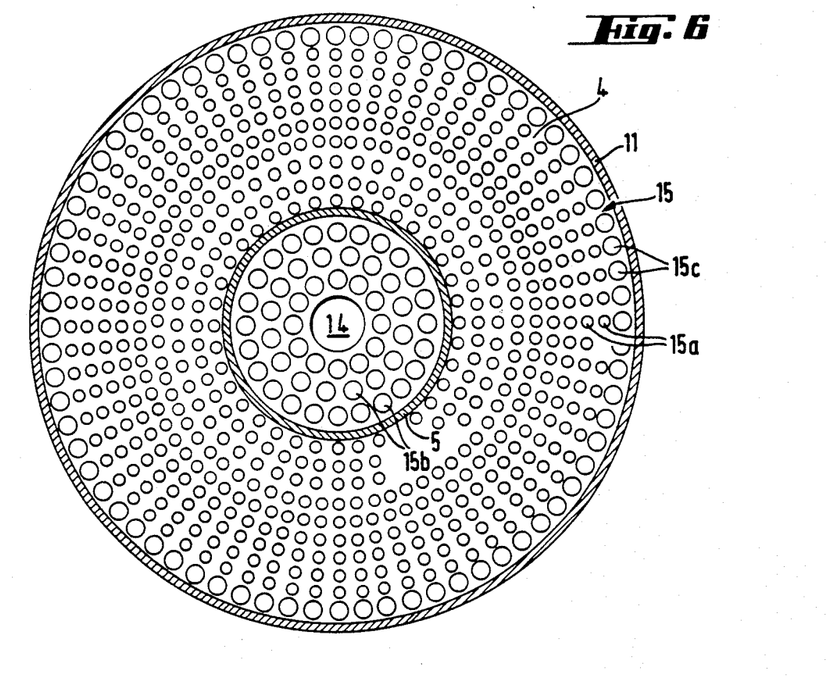
FIG. 6 is a top view of a perforated base means of the present invention showing, in cross section, the outer sidewalls of the chamber and the channeling means.
Figure 7:
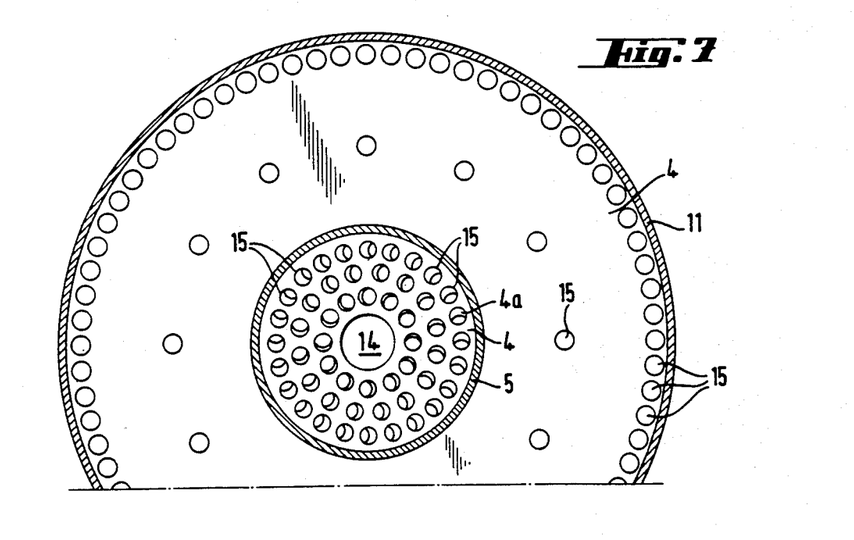
FIG. 7 is a partial top view of one embodiment of the base means having a greater concentration of perforations in the area of the channeling means.
Figure 8:
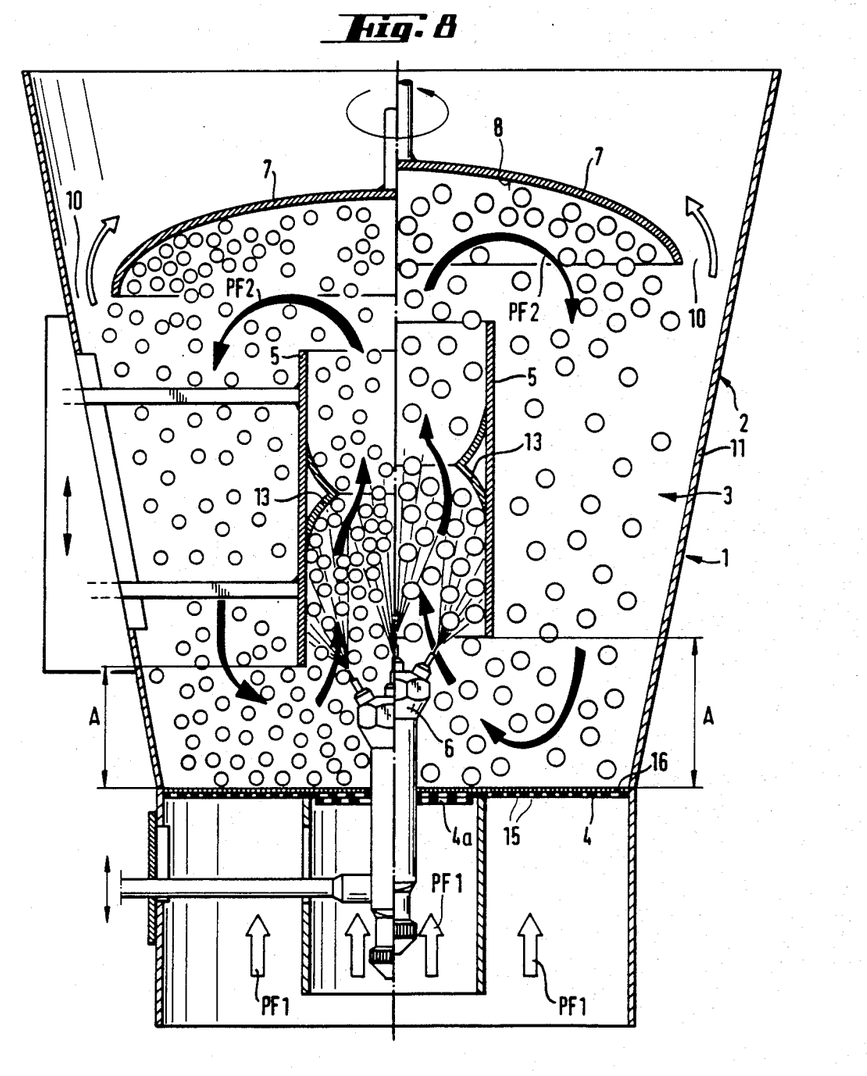
FIG. 8 is a vertical cross sectional view of an alternative embodiment of the present invention having a chamber with upwardly diverging side walls.
Figure 9:
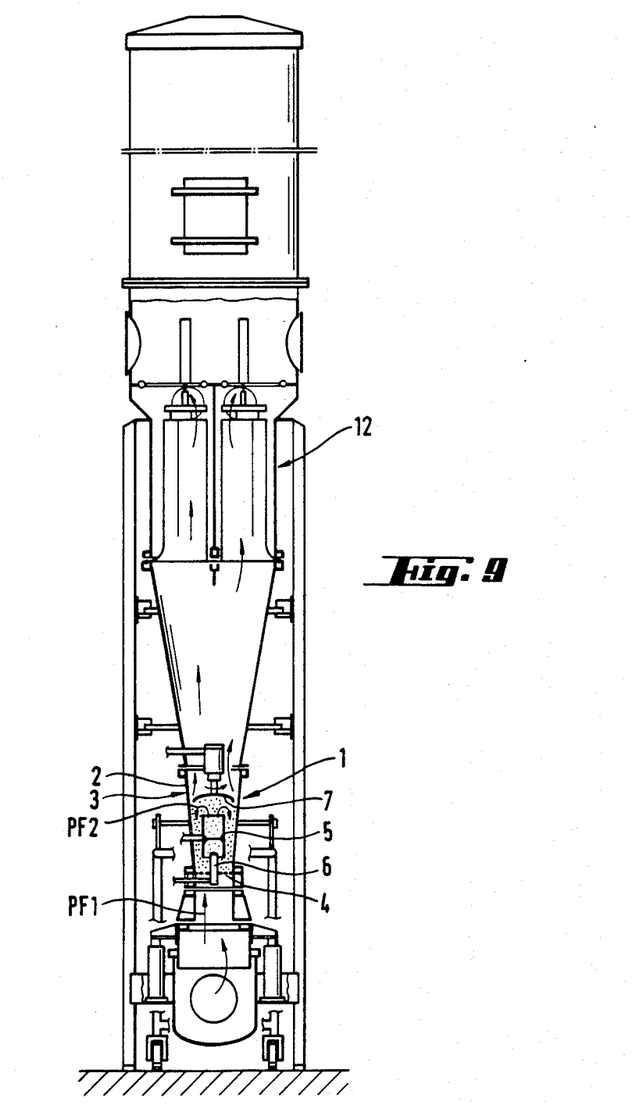
FIG. 9 is an overall view of the apparatus of the present invention showing a filter means.

FIG. 6 is a plan view of a section of the present invention showing a perforated base means 4, and the wall of the housing 11 and channeling means 5 indicated in section. An opening 14 for the spraying means 6 is shown being located centrally in the perforated base means 4. In the illustrated embodiment, the cross sectional areas of the perforations 15 vary over the radial extent of the perforated base means 4. The perforations 15*a* located outside of the projection area of the channeling means 5 have a smaller diameter than the perforations 15*b* lying within the channeling means 5. The different perforation diameters encourage the circulation of the fluid bed. In order to avoid a "dead area" in the outer edge area between the housing wall 11 and the perforated base means 4, perforations 15*c* immediately adjacent to the container wall 11 are provided with perforation cross sectional areas greater than the cross sectional areas of perforations 15*a*. This design creates a gas flow which guides the material being treated back to the center of the fluid bed chamber 3 where it can be once again picked up by the central main gas stream and transported upwardly. Furthermore, it will be understood by those skilled in the art that instead of providing perforations with different diameters in the different radial areas, a comparable effect can be achieved by varying the number and location of identical perforations 15 as shown in FIG. 7.

Still further, the desired material circulation and gas flow can be achieved by providing the perforated base with at least two perforated disks, preferentially having identical perforations, which can be superimposed upon each other, and which can be shifted or rotated relative to each other. It will be appreciated that the effective size of the perforations can be varied by moving one of the perforated disks with respect to the other perforated disk. In this embodiment of the present invention, provisions can be made that only the cross section within the projection area of the rising tube 5 is changed, however, it is also possible to change the perforation cross section over the entire area of the perforated base 4. In the embodiment illustrated in FIG. 7, two perforated disks are shown rotated slightly with respect to each other. In the position represented, approximately half of the perforation cross section is unobstructed. In this manner, adjustment of gas velocities and quantities are possible even during processing so that the gas velocity can be adapted to the increasingly larger pellets.

In one preferred embodiment of the present invention, immediately above the perforated base a fine sieve, (now shown) can be located which prevents small particles from falling through the perforations in the perforated base 4.

The gas velocities passing through the perforations can be changed even in the course of the treatment process so that adaptation corresponding to the particle size during treatment is possible. As a rule, the gas velocity should preferably be increased with increasing size of the pellets.

A filter means 12 is advantageously located above the rotatable means 7 (see FIG. 9) and is preferably designed with a double-chambered retainer filter. In this manner, mountings, drive units and control devices for the rotatable means 7 can be well accommodated.

The housing 2 in the embodiment shown in FIG. 1 is shaped cylindrically in the region of the fluid bed treatment chamber and shows a continuation with outer walls diverging upwardly. In addition to the embodiment illustrated in FIG. 1, the container can be fashioned continuously widening starting approximately from the perforated base 4 as shown in FIG. 4. The expanding shape provides expansion in the direction of flow.

A so-called multi-medium nozzle, as shown in FIG. 12, can be utilized as the spraying means 6, with which, in addition to liquid components, gaseous components can also be introduced into the fluid bed. With the aid of a gas, an acceleration of the liquid leaving the liquid nozzle 17 can be achieved. The gas stream 18 emerges preferably annularly and approximately concentrically around the liquid nozzle. The gas stream causes an acceleration, a finer dispersion, as well as the directing and zone forming of the liquid droplets. The spraying means 6 can also be heated to prevent the spray media from solidifying.

In FIG. 8, a multihead nozzle with several nozzle openings is provided as the sprayling means 6. A multihead nozzle of this kind is used especially when an increased amount of spray medium is desired to be delivered with very fine spray. A multihead nozzle prevents the undesirable relatively large droplet size which can result within the spray with a simple nozzle. The multihead nozzle yields a fine dispersion despite the large emerging quantities of very fine dispersion. Such multihead spray nozzles are especially desirable with large rising tubes.

FIG. 9 illustrates the arrangement of filter means 12 above the rotor disk 7.

In order to prevent electrostatic charges in the fluid bed, an ionization or air humidification device can advantageously be provided.

In the process utilizing the apparatus of the present invention, as shown in FIG. 1, the relative positions and dimensions of the component structures (spraying means 6, channeling means 5, rotatable means 7) are preferably set in the fluid bed chamber 3 such that the material being treated is in a plastic state on impact with the rotatable means 7 to make the intended pelletizing possible. During the transport back down the fluid bed container 3 to approximately the upper edge of a return bed forming around the channeling means 5, a drying process should be completed at least to the point that the individual particles do not stick to each other. As previously mentioned, several rising tubes and several spray nozzles can be provided. It is also possible to utilize a plurality of rotor disks. A rotor disk can cover one or several rising tubes or each rising tube can have its own rotor disk.

The gas stream, as generally depicted by arrow PF1, can also be introduced as separate partial gas streams with one of the partial streams being formed approximately in the central area corresponding to the cross section of a rising tube, and a second partial gas stream being admitted in the surrounding annular area. Gas feeders positioned below a perforated base means 4 are shown in FIGS. 1 and 8. The gas feeders make it possible, especially desirable when coating with fat, to introduce in the central inner area, a gas having a higher temperature than the gas in the outer annular area. This allows working within the channeling means 5 with an elevated temperature and maintaining the fat in a liquid state. It will be appreciated that the coating parameters are selected to provide a coating which is already hardened to the point that plastic molding is possible upon impacting on the underside of the rotatable means 7. An appropriate cooling, desirable when coating with fat, may be provided by the introduction of cooler air into the outer annular area.

We claim:

1. An apparatus for pelletizing a fluidizable material comprising:
    a fluid bed chamber for receiving said material and for permitting passage of an upwardly flowing stream of gas therethrough, wherein said material becomes entrained in said gas stream, said chamber including base means, other sidewalls extending upwardly from said base means and an upper end having an open portion wherein said upper end is opposite said base means, said base means including a plurality of perforations therein for permitting entry of said gas stream into said chamber;
    means disposed in said chamber for spraying a fluid onto said entrained material, thereby inducing a portion of said entrained material to agglomerate and to form relatively plastic particles, and for coating said particles;
    rotatable means, disposed in said upper end of said chamber within said gas stream, including a guide surface against which said particles impinge, for shaping said particles into pellets and for deflecting said particles outwardly toward said sidewalls of said chamber; and
    wherein the vertical position of said rotatable means is adjustable.

2. An apparatus as in claim 1 wherein said rotatable means has an adjustable rotational speed.

3. An apparatus for pelletizing a fluidizable material comprising:
    a fluid bed chamber for receiving said material and for permitting passage of an upwardly flowing stream of gas therethrough, wherein said material becomes entrained in said gas stream, said chamber including base means, outer sidewalls extending upwardly from said base means and an upper end having an open portion wherein said upper end is opposite said base means, said base means including a plurality of perforations herein for permitting entry of said gas stream into said chamber;
    means disposed in said chamber for spraying a fluid onto said entrained material, thereby inducing a portion of said entrained material to agglomerate and to form relatively plastic particles, and for coating said particles;
    rotatable means, disposed in said upper end of said chamber within said gas stream, including a guide surface against which said particles impinge, for shaping said particles into pellets and for deflecting said particles outwardly toward said sidewalls of said chamber; and
    means positioned between said spraying means and said rotatable means for channeling said particles toward said rotatable means and wherein the vertical position of said channeling means is adjustable.

4. An apparatus according to claim 1, wherein said channeling means has a variable vertical length.

5. An apparatus according to claim 1, wherein said channeling means comprises a plurality of rising tubes.

6. An apparatus according to claim 1
    wherein said spraying means comprises a nozzle having a longitudinal axis;
    wherein said channeling means is disposed between said nozzle and said rotatable means and said channeling means has a longitudinal axis; and
    wherein said axes of said nozzle and said channeling means are aligned with each other.

7. An apparatus according to claim 5,
    wherein said spraying means comprises a plurality of nozzles; and
    wherein each of said rising tubes cooperates with one of said nozzles.

8. An apparatus according to claim 1 wherein said rotatable means comprises a rotating disk.

9. An apparatus according to claim 1 wherein said guide surface of said rotatable means is curved downwardly.

10. An apparatus according to claim 1 wherein said guide surface of said rotatable means tapers conically in an upward direction.

11. An apparatus according to claim 1
    wherein said rotatable means is positioned within said chamber to form an annular gap between the periphery of said rotatable means and said sidewalls of said chamber; and
    wherein the cross-sectional area of said annular gap is greater than the sum of the cross sectional areas of said perforations.

12. An apparatus according to claim 11, wherein the cross-sectional area of said annular gap is at least 1.1 times greater than said sum of said cross sectional areas of said perforations.

13. An apparatus according to claim 1 wherein the vertical position of said rotatable means is adjustable.

14. An apparatus according to claim 1 wherein said rotatable means has an adjustable rotational speed.

15. An apparatus according to claim 1 wherein said guide surface of said rotatable means includes means for directing said particles outward toward said sidewalls of said chamber.

16. An apparatus according to claim 15 wherein said directing means are substantially straight.

17. An apparatus as in claim 15 wherein said directing means are curved.

18. An apparatus according to claim 2 wherein said channeling means includes means for guiding said gas stream and said material flowing through said channeling means.

19. An apparatus according to claim 1 wherein the cross sectional areas of said perforations vary.

20. An apparatus according to claim 1 wherein said perforated base means comprises at least two perforated disks and wherein said perforated disks are movable relative to each other.

21. An apparatus according to claim 20 wherein said perforated disks are rotatable relative to each other.

22. An apparatus according to claim 1 wherein said base means is substantially circular and wherein the sizes of said perforations vary radially from the center of said base means.

23. An apparatus according to claim 1 wherein said spraying means is a multi-head nozzle.

24. An apparatus according to claim 1 wherein said spraying means is a multi-medium nozzle.

25. An apparatus according to claim 3 wherein said spraying means is height adjustable, said rotatable means is height adjustable and said channeling means has a variable vertical length; and
which apparatus further comprises a process control computer for controlling the height of said spraying means and said rotatable means, and the height and length of said channeling means, as a function of at least the material to be pelletized and the fluid to be sprayed and coated.

26. An apparatus in accordance with claim 1, further comprising means for preventing electromagnetic charges in said fluid bed chamber.

27. An apparatus according to claim 1, further comprising means for heating said spraying means.

28. An apparatus according to claim 1:
wherein said base means includes a first group of said perforations aligned below said channeling means, and a second group of said perforations not aligned below said channeling means;
wherein said gas stream has a first component at a first temperature and a second component at a second temperature; and
wherein said apparatus further comprises means for feeding said gas stream through said perforations wherein said feeding means introduces said first component through said first group of perforations and said second component through said second group of perforations.

29. An apparatus according to claim 28 wherein said first temperature is higher than said second temperature.

30. An apparatus in accordance with claim 28: wherein said first component is introduced at a first velocity and said second component is introduced at a second velocity.

31. An apparatus in accordance with claim 30 wherein said first velocity is greater than said second velocity.

32. An apparatus as in claim 3 wherein said channeling means comprises means for the deflection of currents within said channeling means.

33. An apparatus for pelletizing a fluidizable material comprising:
a fluid bed chamber for receiving said material and for permitting passage of an upwardly flowing stream of gas therethrough, wherein said material becomes entrained in said gas stream, said chamber including base means, outer sidewalls extending upwardly from said base means and an upper end having an open portion wherein said upper end is opposite said base means, said base means including a plurality of perforations therein for permitting entry of said gas stream into said chamber;
means disposed in said chamber for spraying a fluid onto said entrained material, thereby inducing a portion of said entrained material to agglomerate and to form relatively plastic particles, and for coating said particles;
rotatable means, disposed in said upper end of said chamber within said gas stream, including a guide surface against which said particles impinge, for shaping said particles into pellets and for deflecting said particles outwardly toward said sidewalls of said chamber; and
wherein the cross sectional area of at least one of said perforations is variable.

34. An apparatus according to claim 33 wherein said perforated base means comprises at least two perforated discs and wherein said perforated discs are movable relative to each other.

35. An apparatus for pelletizing a fluidizable material comprising:
a fluid bed chamber for receiving said material and for permitting passage of an upwardly flowing stream of gas therethrough, wherein said material becomes entrained in said gas stream, said chamber including base means, outer sidewalls extending upwardly from said base means, and an upper end having an open portion wherein said upper end is opposite said base means, said base means including a plurality of perforations therein for permitting entry of said gas stream into said chamber;
means disposed in said chamber for spraying a fluid onto said entrained material, thereby inducing a portion of said entrained material to agglomerate and to form relatively plastic particles, and for coating said particles;
rotatable means, disposed in said upper end of said chamber within said gas stream, including a guide surface against which said particles impinge, for shaping said particles into pellets and for deflecting said particles outwardly toward said sidewalls of said chamber;
wherein said apparatus further comprises means positioned between said spraying means and said rotatable means for channeling said particles towards said rotatable means;
wherein said base means includes a first group of perforations aligned below said channeling means, and a second group of perforations which are not aligned below said channeling means; and
wherein said first group of perforations are a different size than said second group of perforations.

36. An apparatus according to claim 35 wherein said perforations of said first group of perforations are larger than said perforations of said second group of perforations.

37. An apparatus as in claim 35 wherein said base means further comprises an third group of perforations wherein said perforations of said third group are larger than said perforations of said second group.

38. An apparatus according to claim 37 wherein said third group of perforations is adjacent said outer side walls.

39. An apparatus for pelletizing a fluidizable material comprising:
a fluid bed chamber for receiving said material and for permitting passage of an upwardly flowing stream of gas therethrough, wherein said material becomes entrained in said gas stream, said chamber including base means, outer sidewalls extending upwardly from said base means and an upper end having an open portion wherein said upper end is opposite said base means, said base means including a plurality of perforations therein for permitting entry of said gas stream into said chamber;

means disposed in said chamber for spraying a fluid onto said entrained material, thereby inducing a portion of said entrained material to agglomerate and to form relatively plastic particles, and for coating said particles;

rotatable means, disposed in said upper end of said chamber within said gas stream, including a guide surface against which said particles impinge, for shaping said particles into pellets and for deflecting said particles outwardly toward said sidewalls of said chamber; and means positioning between said spraying means and said rotatable means for channeling said particles toward said rotatable means and wherein the length of said channeling means is adjustable.

* * * * *